(12) United States Patent
Nishimura et al.

(10) Patent No.: US 12,542,506 B2
(45) Date of Patent: Feb. 3, 2026

(54) POWER CONVERSION APPARATUS

(71) Applicant: DENSO CORPORATION, Kariya (JP)

(72) Inventors: Syusei Nishimura, Nisshin (JP); Kazuhiro Shirakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 18/507,399

(22) Filed: Nov. 13, 2023

(65) Prior Publication Data

US 2024/0088813 A1 Mar. 14, 2024

Related U.S. Application Data

(63) Continuation of application No. PCT/JP2022/019231, filed on Apr. 28, 2022.

(30) Foreign Application Priority Data

May 12, 2021 (JP) .................................. 2021-081282

(51) Int. Cl.
*H02P 27/06* (2006.01)
*H02K 11/02* (2016.01)
*H02K 11/33* (2016.01)

(52) U.S. Cl.
CPC .............. *H02P 27/06* (2013.01); *H02K 11/02* (2013.01); *H02K 11/33* (2016.01)

(58) Field of Classification Search
CPC .......... H02P 27/06; H02K 11/33; H02K 11/02
See application file for complete search history.

(56) References Cited

U.S. PATENT DOCUMENTS

| | | | |
|---|---|---|---|
| 4,160,938 A * | 7/1979 | Akamatsu | H02P 25/024 318/722 |
| 2003/0067278 A1* | 4/2003 | Nakamura | H02P 27/06 318/400.04 |
| 2014/0306563 A1 | 10/2014 | Oyama et al. | |
| 2015/0140851 A1* | 5/2015 | Wang | H01R 13/6597 439/275 |
| 2017/0232862 A1* | 8/2017 | Woll | B60L 58/18 318/139 |
| 2017/0331392 A1* | 11/2017 | Sahhary | H02J 7/0014 |
| 2018/0019687 A1* | 1/2018 | Taniguchi | H02P 27/06 |
| 2021/0351684 A1 | 11/2021 | Nishimura et al. | |
| 2025/0033530 A1* | 1/2025 | Zhang | B60L 15/007 |

FOREIGN PATENT DOCUMENTS

JP 2015-002610 A 1/2015

* cited by examiner

*Primary Examiner* — Zoheb S Imtiaz
(74) *Attorney, Agent, or Firm* — Oliff PLC

(57) ABSTRACT

An inverter in a power conversion apparatus has a series connection body of upper- and lower-arm switches. The series connection body connects in parallel to a series connection body of first and second power storage units. A rotating electric machine has a winding that is electrically connected to the inverter. A neutral-point wiring electrically connects a negative electrode side of the first power storage unit and a positive electrode side of the second power storage unit, and a neutral point of the winding. A control unit performs switching control of the upper- and lower-arm switches such that a current flows between the first power storage unit and the second power storage unit through the inverter, the winding, and the neutral-point wiring. A case houses at least the inverter and provides a shield function. At least a portion of the neutral-point wiring is housed inside the case.

20 Claims, 10 Drawing Sheets

POWER CONVERSION APPARATUS

CROSS-REFERENCE TO RELATED APPLICATION

The present application is a continuation application of International Application No. PCT/JP2022/019231, filed on Apr. 28, 2022, which claims priority to Japanese Patent Application No. 2021-081282, filed on May 12, 2021. The contents of these applications are incorporated herein by reference in their entirety.

BACKGROUND

Technical Field

The present disclosure relates to a power conversion apparatus.

Related Art

A power conversion apparatus that includes an inverter and a rotating electric machine having a winding that is electrically connected to the inverter is known. In the power conversion apparatus, switching control of upper- and lower-arm switches configuring the inverter is performed to drive the rotating electric machine.

SUMMARY

The present disclosure provides a power conversion apparatus that includes an inverter, a rotating electric machine, a neutral-point wiring, a control unit, and a case. The inverter includes a series connection body of upper- and lower-arm switches. The series connection body is connected in parallel to a series connection body of a first power storage unit and a second power storage unit. The rotating electric machine includes a winding that is electrically connected to the inverter. The neutral-point wiring electrically connects a negative electrode side of the first power storage unit and a positive electrode side of the second power storage unit, and a neutral point of the winding. The control unit performs switching control of the upper- and lower-arm switches such that a current flows between the first power storage unit and the second power storage unit through the inverter, the winding, and the neutral-point wiring. The case houses at least the inverter and provides a shield function. At least a portion of the neutral-point wiring is housed inside the case.

DESCRIPTION OF THE EMBODIMENTS

Figure 1:
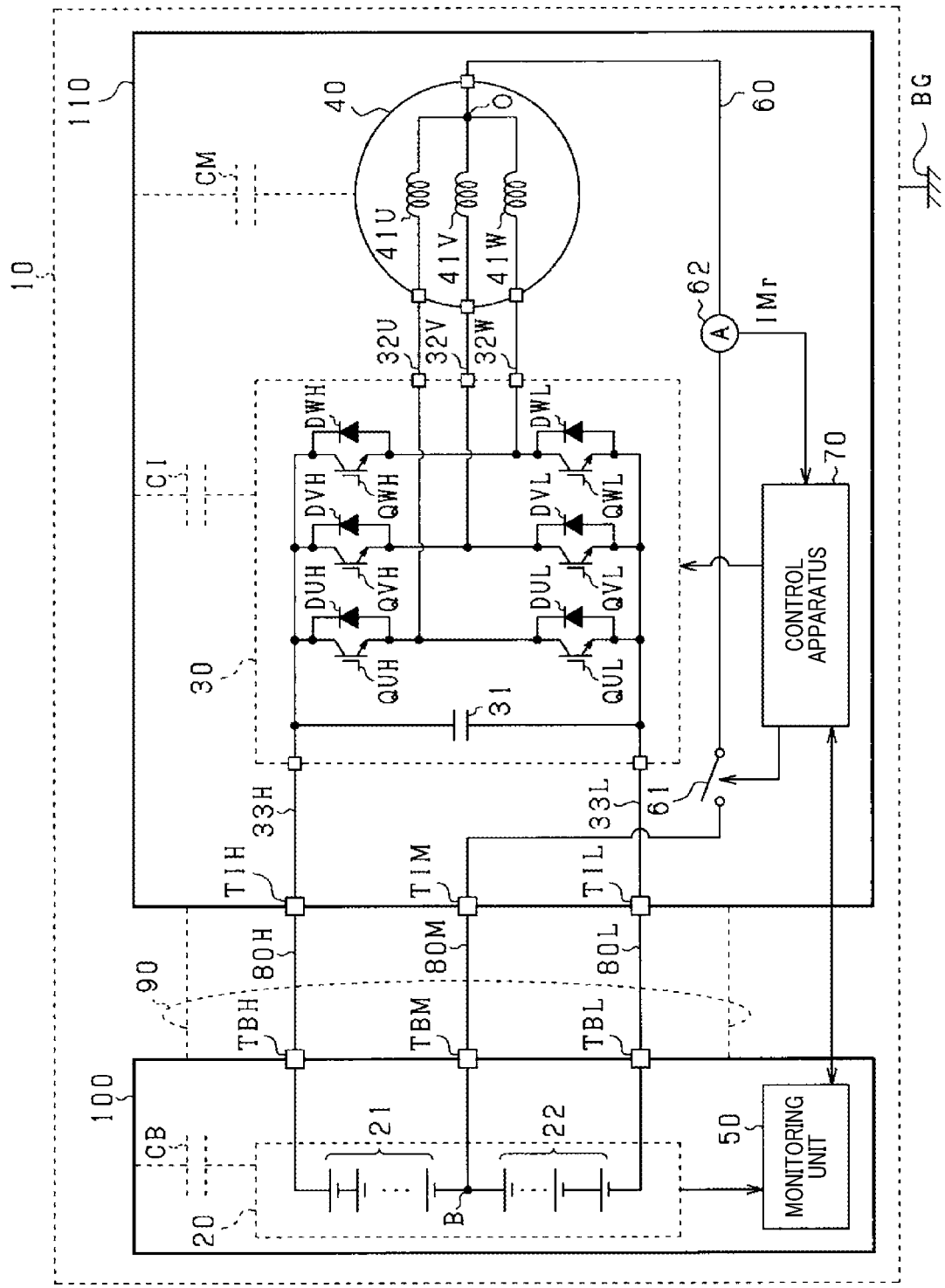
FIG. 1 is a configuration diagram illustrating a power conversion apparatus according to a first embodiment.

Conventionally, a power conversion apparatus that includes an inverter and a rotating electric machine having a winding that is electrically connected to the inverter is known. Switching control of upper- and lower-arm switches configuring the inverter is performed to drive the rotating electric machine. Noise is generated as a result of the switching control being performed.

JP-A-2015-002610 describes a power conversion apparatus in which an inverter case housing the inverter is disposed on an upper side of a motor case housing the rotating electric machine, and the inverter case and the motor case are connected by a pair of vibration-proofing members. The vibration-proofing members are configured such that an impedance of a path of the motor case, the vibration-proofing members, and the inverter case is less than an impedance of a path of the motor case and a body ground. As a result, much of the noise propagated from the inverter side to the rotating electric machine side can be returned toward the inverter case side through the motor case and the vibration-proofing members. Noise transmission to the body ground is reduced.

As the power conversion apparatus, there is a power conversion apparatus in which the upper- and lower-arm switches are connected in parallel to a series connection body of a first power storage unit and a second power storage unit. The power conversion apparatus also includes neutral-point wiring that electrically connects a negative electrode side of the first power storage unit and a positive electrode side of the second power storage unit, and a neutral point of a winding. In the power conversion apparatus, switching control of the upper- and lower-arm switches is performed such that a current flows between the first power storage unit and the second power storage unit through the inverter, the winding, and the neutral-point wiring. Noise is generated as a result of this switching control being performed as well.

It is thus desired to provide a power conversion apparatus that includes a neutral-point wiring that electrically connects a negative electrode side of a first power storage unit and a positive electrode side of a second power storage unit, and a neutral point of a winding, the power conversion apparatus being capable of reducing noise externally transmitted from the power conversion apparatus.

An exemplary embodiment of the present disclosure provides a power conversion apparatus that includes: an inverter that includes a series connection body of upper- and lower-arm switches, the series connection body being connected in parallel to a series connection body of a first power storage unit and a second power storage unit; a rotating electric machine that includes a winding that is electrically connected to the inverter; a neutral-point wiring that electrically connects a negative electrode side of the first power storage unit and a positive electrode side of the second power storage unit, and a neutral point of the winding; a control unit that performs switching control of the upper- and lower-arm switches such that a current flows between the first power storage unit and the second power storage unit through the inverter, the winding, and the neutral-point wiring; and a case that houses at least the inverter and provides a shield function, in which at least a portion of the neutral-point wiring is housed inside the case.

In the exemplary embodiment, noise emitted outside the power conversion apparatus through the neutral-point wiring can be reduced as a result of the case housing at least a portion of the neutral-point wiring providing the shield function.

The above-described object, other objects, characteristics, and advantages of the present disclosure will be further clarified through the detailed description herebelow, with reference to the accompanying drawings.

Embodiments implementing a power conversion apparatus of the present disclosure will hereinafter be described with reference to the drawings. The power conversion apparatus is mounted in a vehicle, such as an electric car or a hybrid car. According to the embodiments, identical configurations or corresponding configurations are given the same reference numbers for convenience.

First Embodiment

As shown in FIG. 1, a power conversion apparatus 10 includes an assembled battery 20, an inverter 30, and a rotating electric machine 40. The rotating electric machine 40 is a three-phase synchronous motor, and includes U-, V-, and W-phase windings 41U, 41V, and 41W that are connected by a star connection as a stator winding. The phase windings 41U, 41V, and 41W are arranged such as to be shifted from each other by an electrical angle of 120°. For example, the rotating electric machine 40 may be a permanent-magnet synchronous motor. According to the present embodiment, the rotating electric machine 40 is a main onboard engine and serves as a traveling power source of the vehicle.

The inverter 30 includes series connection bodies of upper-arm switches QUH, QVH, and QWH and lower arm switches QUL, QVL, and QWL amounting to three phases. According to the present embodiment, as the switches QUH, QVH, QWH, QUL, QVL, and QWL, voltage-controlled-type semiconductor switching elements are used. Specifically, insulated-gate bipolar transistors (IGBTs) are used. Therefore, a high-potential-side terminal of each of the switches QUH, QVH, QWH, QUL, QVL, and QWL is a collector and a low-potential-side terminal is an emitter. Diodes DUH, DVH, DWH, DUL, DVL, and DWL that are freewheeling diodes are respectively connected in antiparallel to the switches QUH, QVH, QWH, QUL, QVL, and QWL.

A first end of the U-phase winding 41U is connected to the emitter of the U-phase upper-arm switch QUH and the collector the U-phase lower-arm switch QUL, with a U-phase wiring 32U therebetween. A first end of the V-phase winding 41V is connected to the emitter of the V-phase upper-arm switch QVH and the collector the V-phase lower-arm switch QVL, with a V-phase wiring 32V therebetween. A first end of the W-phase winding 41W is connected to the emitter of the W-phase upper-arm switch QWH and the collector the W-phase lower-arm switch QWL, with a W-phase wiring 32W therebetween. Second ends of the U-, V-, and W-phase windings are connected to one another at a neutral point O. Here, according to the present embodiment, the phase windings 41U, 41V, and 41W are set to have the same number of turns. As a result, for example, the phase windings 41U, 41V, and 41W may be set to have the same inductance. Here, according to the present embodiment, the U-, V-, and W-phase wirings 32U, 32V, and 32W correspond to "motive-power wiring".

The inverter 30 includes a capacitor 31 that connects the collectors of the upper-arm switches QUH, QVH, and QWH and the emitters of the lower-arm switches QUL, QVL, and QWL. Here, the capacitor 31 may be provided outside the inverter 30.

The power conversion apparatus 10 includes a common case 110 that houses the inverter 30 and the rotating electric machine 40. That is, the power conversion apparatus 10 is a so-called mechanically and electronically integrated apparatus. For example, the common case 110 may have a bottom plate portion, a peripheral wall portion provided in a peripheral portion of the bottom plate portion, and a top plate portion that covers a side of the peripheral wall portion opposite the bottom plate portion side. The inverter 30 and the rotating electric machine 40 are disposed in the bottom plate portion in a housing space surrounded by the bottom plate portion, the peripheral wall portion, and the top plate portion. According to the present embodiment, the common case 110 is composed of aluminum and provides an electromagnetic shield function.

Inside the common case 110, the collectors of the upper-arm switches QUH to QWH and a high-potential-side inverter terminal TIH of the common case 110 are connected by a high-potential-side electric-power wiring 33H. In addition, inside the common case 110, the emitters of the lower-arm switches QUL, QVL, and QWL and a low-potential-side inverter terminal TIL of the common case 110 are connected by a low-potential-side electric-power wiring 33L.

The power conversion apparatus 10 includes a battery case 100 that houses the assembled battery 20. For example, the battery case 100 may have a bottom plate portion, a peripheral wall portion provided in a peripheral portion of the bottom plate portion, and a top plate portion that covers a side of the peripheral wall portion opposite the bottom plate portion side. The assembled battery 20 is disposed in the bottom plate portion in a housing space surrounded by the bottom plate portion, the peripheral wall portion, and the top plate portion. According to the present embodiment, the battery case 100 is composed of aluminum and provides an electromagnetic shield function. The battery case 100 is disposed in a position separated from the common case 110.

The battery case 100 and the common case 110 are disposed in a body of the vehicle that functions as a body ground BG. For example, the battery case 100 and the common case 110 may be individually disposed in the body. Alternatively, the battery case 100 and the common case 110 may be disposed in the body in a stacked state.

The power conversion apparatus 10 includes a high-potential-side wiring 80H, a low-potential-side wiring 80L, and a battery-side inter-case wiring 80M. The high-potential-side wiring 80H connects the high-potential-side inverter terminal TIH of the common case 110 and a high-potential-side battery terminal TBH of the battery case 100. The low-potential-side wiring 80L connects the low-potential-side inverter terminal TIL of the common case 110 and a low-potential-side battery terminal TBL of the battery case 100. That is, the high-potential-side wiring 80H and the low-potential-side wiring 80L are disposed outside each of the battery case 100 and the common case 110. Here, for example, the terminals TIH, TBH, TIL, and TBL may be connectors.

The assembled battery 20 is configured as a series connection body of battery cells that are unit batteries. For example, terminal voltages (such as rated voltages) of the battery cells configuring the assembled battery 20 may be set to be the same as one another. For example, a secondary battery, such as a lithium ion battery, may be used as the battery cell.

According to the present embodiment, among the battery cells configuring the assembled battery 20, a series connection body of a plurality of battery cells on the high potential side configures a first storage battery 21 (corresponding to a "first power storage unit") and a series connection body of a plurality of battery cells on the low potential side configures a second storage battery 22 (corresponding to a "second power storage unit"). That is, the assembled battery 20 is divided into two blocks.

In the assembled battery 20, an intermediate terminal B is connected to a negative electrode terminal of the first storage battery 21 and a positive electrode terminal of the second storage battery 22.

A monitoring unit 50 is housed in the battery case 100. The monitoring unit 50 monitors a terminal voltage, a state-of-charge (SOC), a state-of-health (SOH), a temperature, and the like of each battery cell configuring the assembled battery 20. Monitoring information of the monitoring unit 50 is inputted to a control apparatus 70 (corresponding to a "control unit") provided in the power conversion apparatus 10. According to the present embodiment, the control apparatus 70 is housed inside the common case 110.

The power conversion apparatus 10 includes a connection path 60 and a neutral-point switch 61. The connection path 60 and the neutral-point switch 61 are housed inside the common case 110. The connection path 60 connects the neutral point O and a neutral-point inverter terminal TIM of the common case 110. The neutral-point switch 61 is provided on the connection path 60. According to the present embodiment, a relay is used as the neutral-point switch 61. As a result of the neutral-point switch 61 being turned on, the neutral-point inverter terminal TIM and the neutral point O are electrically connected. Meanwhile, as a result of the neutral-point switch 61 being turned off, the neutral-point inverter terminal TIM and the neutral point O are electrically disconnected.

A neutral-point battery terminal TBM of the battery case 100 is connected to the neutral-point inverter terminal TIM by the battery-side inter-case wiring 80M. That is, the battery-side inter-case wiring 80M is disposed outside each of the battery case 100 and the common case 110. Here, for example, the terminals TIM and TBM may be connectors. In addition, according to the present embodiment, the connection path 60 and the battery-side inter-case wiring 80M correspond to a "neutral-point wiring".

The power conversion apparatus 10 includes a current sensor 62. The current sensor 62 detects a current flowing to the connection path 60. A detection value of the current sensor 62 is inputted to the control apparatus 70. The current sensor 62 is housed inside the common case 110.

The control apparatus 70 is mainly configured by a microcomputer. The microcomputer includes a central processing unit (CPU). Functions provided by the microcomputer can be provided by software (i.e., program) stored in a non-transitory computer-readable (tangible) memory apparatus and a computer running the software, only software, only hardware, or a combination thereof.

The control apparatus 70 performs switching control of the switches QUIET to QWL configuring the inverter 30 to perform feedback control of a controlled variable of the rotating electric machine 40 to a command value thereof. For example, the controlled variable may be torque. For each phase, the upper-arm switch and the lower-arm switch are alternately turned on. The control apparatus 70 is capable of turning on and off the neutral-point switch 61, and communicating with the monitoring unit 50.

The control apparatus 70 performs temperature increase control and voltage equalization control in a state in which the neutral-point switch 61 is turned on. Temperature increase control is switching control of the inverter 30 to send an alternating current between the first storage battery 21 and the second storage battery 22, through the connection path 60 and the battery-side inter-case wiring 80M. As a result of this control, the temperature of the assembled battery 20 is increased. Voltage equalization control is switching control of the inverter 30 to send a direct current from one to the other of the first storage battery 21 and the second storage battery 22, through the connection path 60 and the battery-side inter-case wiring 80M. As a result of this control, energy is supplied from one to the other of the first storage battery 21 and the second storage battery 22, and voltages of the first storage battery 21 and the second storage battery 22 are equalized.

The control apparatus 70 calculates a neutral-point command current for temperature increase control or voltage equalization control. The control apparatus 70 controls the current detected by the current sensor 62 to the neutral-point command current. Here, the control apparatus 70 is also capable of simultaneously performing temperature increase control and voltage equalization control. In addition, when the controlled variable of the rotating electric machine 40 is controlled without temperature increase control or voltage equalization control being performed, the control apparatus 70 turns off the neutral-point switch 61.

The power conversion apparatus 10 includes a battery-side shield wire 90. The battery-side shield wire 90 collectively covers the high-potential-side wiring 80H, the low-potential-side wiring 80L, and the battery-side inter-case wiring 80M. As a result of switching control of the inverter 30 when the rotating electric machine 40 is driven, or temperature increase control or voltage equalization control is performed, currents flow to the wirings 80H, 80L, and 80M, and noise is generated. As a result of the battery-side shield wire 90, noise emitted outside through the wirings 80H, 80L, and 80M can be reduced.

As a result of the battery-side shield wire 90, the high-potential-side wiring 80H, the low-potential-side wiring 80L, and the battery-side inter-case wiring 80M are in a bundled state. As a result, the wirings 80H, 80L, and 80M that are sources of noise emission can be prevented from spreading out, and a noise reduction effect of the battery-side shield wire 90 can be enhanced.

The connection path 60 is housed inside the common case 110. As a result of the common case 110 providing a function as an electromagnetic shield, noise emitted outside the common case 110 through the connection path 60 can be reduced.

The battery-side shield wire 90 electrically connects the battery case 100 and the common case 110. As a result, noise flowing out to the body ground BG is reduced. Hereafter, a principle by which outflowing noise can be reduced will be described.

In FIG. 1, CI indicates stray capacitance (hereafter, inverter stray capacitance) formed between the inverter 30 and the common case 110. CM indicates stray capacitance (hereafter, motor stray capacitance) formed between the rotating electric machine 40 and the common case 110. CB indicates stray capacitance (hereafter, battery stray capacitance) formed between the assembled battery 20 and the battery case 100.

Noise (common mode noise) generated as a result of switching control of the inverter 30 is propagated from the inverter 30 to the common case 110 through the inverter stray capacitance CI. Here, the common case 110 and the battery case 100 are electrically connected by the battery-side shield wire 90. Therefore, an impedance between the common case 110 and the battery case 100 is lower than an impedance between each of the common case 110 and the battery case 100, and the body ground BG. As a result, a large portion of the noise propagated to the common case 110 returns to the common case 110 through the battery case 100 and the battery-side shield wire 90. Consequently, noise flowing out to the body ground BG can be suitably reduced.

Variation Examples According to the First Embodiment

The battery case 100 and the common case 110 may be formed by a non-metal material (such as synthetic resin) that does not provide the electromagnetic shield function, rather than a metal material. In this case, a plating process (metal plating process) providing the electromagnetic shield function may be performed on surfaces of the cases 100 and 110. In addition, in this case, plated portions of the cases 100 and 110 may be electrically connected to each other by the battery-side shield wire 90.

When the common case 110 is formed by a non-metal material that does not provide the electromagnetic shield function, the U-, V-, and W-phase wirings 32U, 32V, and 32W, and the connection path 60 may be collectively covered by a shield wire inside the common case 110. As a result, emission noise emitted outside the common case 110 can be reduced.

Inside the common case 110, a wall portion that partitions the housing space for the inverter 30 and the housing space for the rotating electric machine 40 may be provided. In this case, the U-, V-, and W-phase wirings 32U, 32V, and 32W may be inserted through a through hole formed in the wall portion.

Second Embodiment

Figure 2:
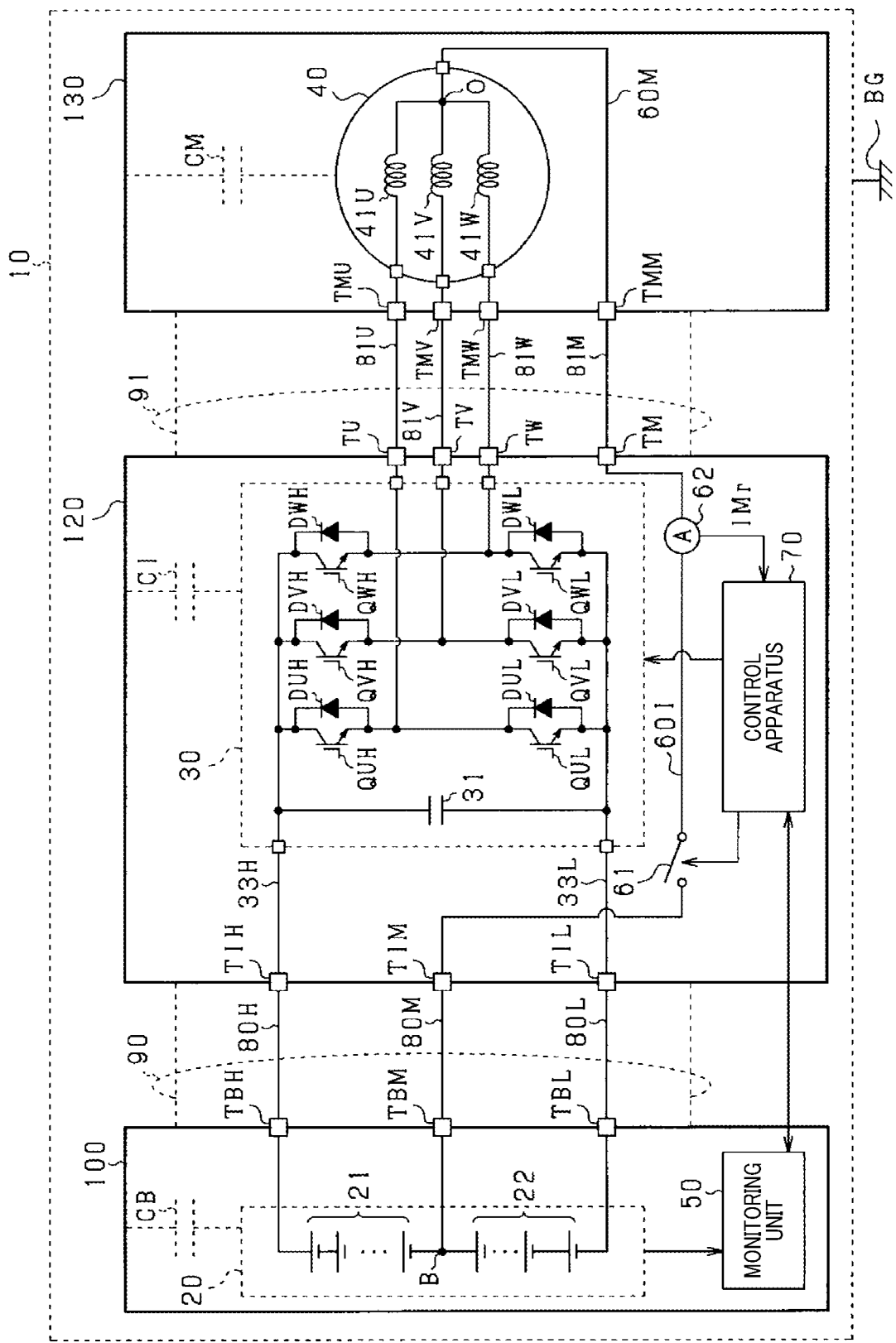
FIG. 2 is a configuration diagram illustrating a power conversion apparatus according to a second embodiment.

A second embodiment will be described below with reference to the drawings, mainly focusing on differences with the first embodiment. As shown in FIG. 2, according to the present embodiment, the inverter 30 and the rotating electric machine 40 are housed in individual cases.

The inverter 30 is housed in an inverter case 120 (corresponding to a "first case") and the rotating electric machine 40 is housed in a motor case 130 (corresponding to a "second case"). The inverter case 120, the motor case 130, and the battery case 100 are disposed in positions separated from each other.

For example, the inverter case 120 and the motor case 130 each may have a bottom plate portion, a peripheral wall portion provided in a peripheral portion of the bottom plate portion, and a top plate portion that covers a side of the peripheral wall portion opposite the bottom plate portion side. The inverter 30 is disposed in the bottom plate portion of the inverter case 120, and the rotating electric machine 40 is disposed in the bottom plate portion of the motor case 130. According to the present embodiment, the inverter case 120 and the motor case 130 are composed of aluminum and provide an electromagnetic shield function. Here, according to the present embodiment, the inverter case 120 has the high-potential-side inverter terminal TIH, the neutral-point inverter terminal TIM, and the low-potential-side inverter terminal TIL.

A U-phase inverter terminal TU of the inverter case 120 is connected to the emitter of the U-phase upper-arm switch QUH and the collector of the U-phase lower-arm switch QUL. A V-phase inverter terminal TV of the inverter case 120 is connected to the emitter of the V-phase upper-arm switch QVH and the collector of the V-phase lower-arm switch QVL. A W-phase inverter terminal TW of the inverter case 120 is connected to the emitter of the W-phase upper-arm switch QWH and the collector of the W-phase lower-arm switch QWL.

The power conversion apparatus 10 includes U-, V-, and W-phase wirings 81U, 81V, and 81W. The phase wirings 81U to 81W are provided outside of each of the inverter case 120 and the motor case 130.

A motor U-phase terminal TMU of the motor case 130 is connected to the U-phase inverter terminal TU by the U-phase wiring 81U. The first end of the U-phase winding 41U is connected to the motor U-phase terminal TMU. A motor V-phase terminal TMV of the motor case 130 is connected to the V-phase inverter terminal TV by the V-phase wiring 81V. The first end of the V-phase winding 41V is connected to the motor V-phase terminal TMV. A motor W-phase terminal TMW of the motor case 130 is connected to the W-phase inverter terminal TW by the W-phase wiring 81W. The first end of the W-phase winding 41W is connected to the motor W-phase terminal TMW.

A motor-side neutral-point wiring 60M that connects the neutral point O and a motor neutral-point terminal TMM is housed in the motor case 130. The motor neutral-point terminal TMM and a neutral-point connection terminal TM of the inverter case 120 are connected by a motor-side inter-case wiring 81M. Here, for example, the terminals TM, TMM, TU, TV, TW, TMU, TMV, and TMW may be connectors.

An inverter-side neutral-point wiring 60I that connects the neutral-point connection terminal TM and the neutral-point inverter terminal TIM, the neutral-point switch 61, and the current sensor 62 are housed in the inverter case 120. The neutral-point switch 61 is provided on the inverter-side neutral-point wiring 60I. In addition, the current sensor 62 according to the present embodiment detects a current flowing to the inverter-side neutral-point wiring 60I. Here, according to the present embodiment, the motor-side neutral-point wiring 60M, the motor-side inter-case wiring 81M, the inverter-side neutral-point wiring 60I, and the battery-side inter-case wiring 80M correspond to the "neutral-point wiring".

The power conversion apparatus 10 includes a motor-side shield wire 91. The motor-side shield wire 91 collectively covers the U- to W-phase wirings 81U to 81W and the motor-side inter-case wiring 81M. As a result, noise emitted outside through the wirings 81U to 81W and 81M as a result of switching control of the inverter 30 can be reduced.

As a result of the motor-side shield wire 91, the U- to W-phase wirings 81U to 81W and the motor-side inter-case wiring 81M are in a bundled state. Consequently, the wirings 81U to 81W and 81M that are sources of noise emission can be prevented from spreading out, and a noise reduction effect of the motor-side shield wire 91 can be enhanced.

The motor-side shield wire 91 electrically connects the inverter case 120 and the motor case 130. As a result, noise that flows out to the body ground B can be reduced.

In FIG. 2, CI indicates the inverter stray capacitance formed between the inverter 30 and the inverter case 120. CM indicates the motor stray capacitance formed between the rotating electric machine 40 and the motor case 130. The inverter case 120 and the motor case 130 are electrically connected by the motor-side shield wire 91. Therefore, an impedance between the inverter case 120 and the motor case 130 is lower than an impedance between each of the inverter case 120 and the motor case 130 and the body ground BG. As a result, in a manner similar to that according to the first embodiment, noise flowing out to the body ground BG can be reduced.

Third Embodiment

Figure 3:
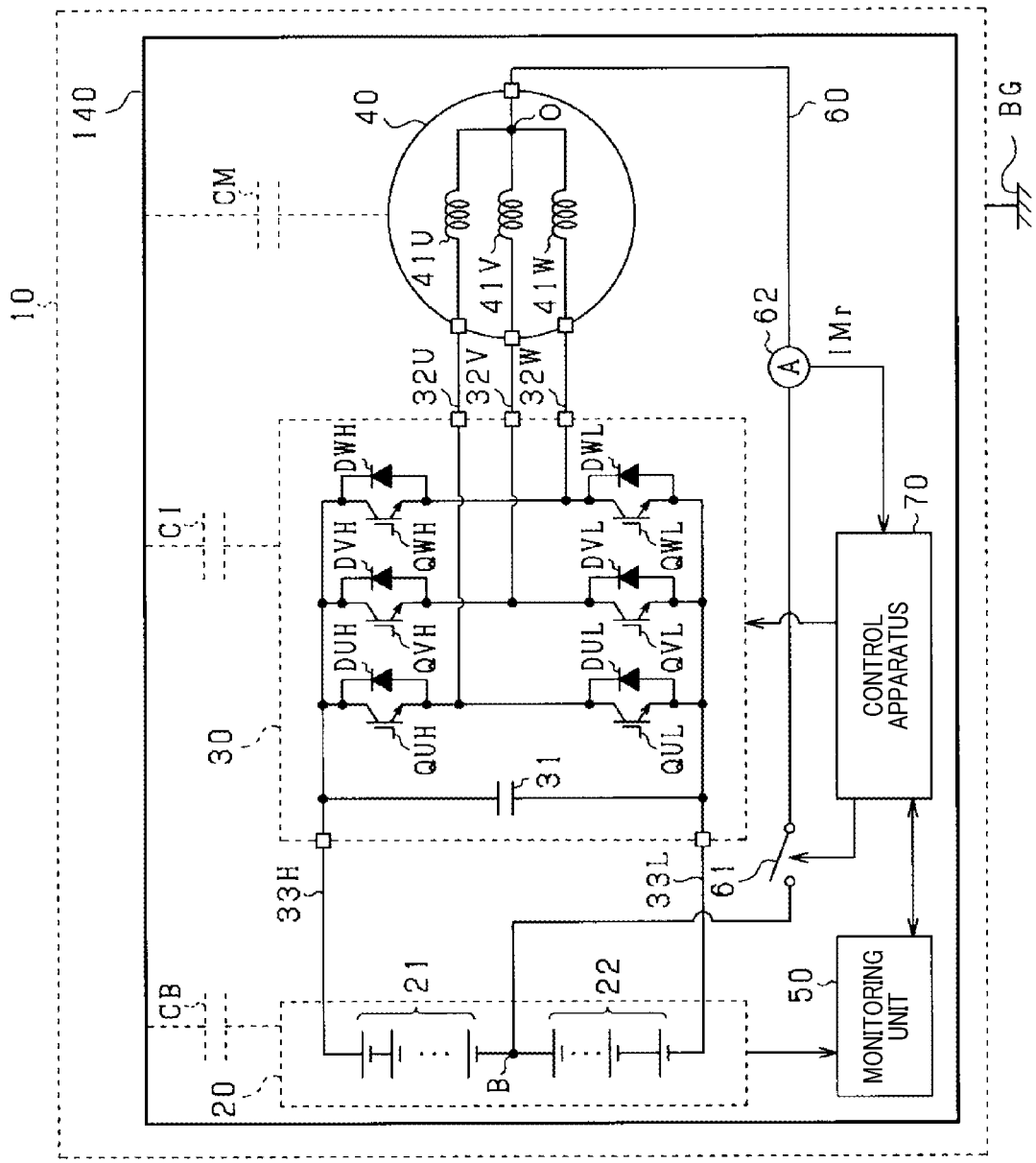
FIG. 3 is a configuration diagram illustrating a power conversion apparatus according to a third embodiment.

A third embodiment will be described below with reference to the drawings, mainly focusing on differences with the above-described embodiments. As shown in FIG. 3, according to the present embodiment, the inverter 30, the rotating electric machine 40, and the assembled battery 20 are housed in a common case 140. The case 140 also houses the monitoring unit 50, the control apparatus 70, the current sensor 62, the connection path 60, and the neutral-point switch 61.

For example, the case 140 may have a bottom plate portion, a peripheral wall portion provided in a peripheral portion of the bottom plate portion, and a top plate portion that covers a side of the peripheral wall portion opposite the bottom plate portion side. The inverter 30, the rotating electric machine 40, and the assembled battery 20 are disposed in the bottom plate portion of the case 140. According to the present embodiment, the case 140 is composed of aluminum and provides an electromagnetic shield function.

Here, in FIG. 3, CI indicates the inverter stray capacitance formed between the inverter 30 and the case 140. CM indicates the motor stray capacitance formed between the rotating electric machine 40 and the case 140. CB indicates the battery stray capacitance formed between the assembled battery 20 and the case 140.

According to the present embodiment described above, noise generated as a result of switching control of the inverter 30 can be suitably suppressed from being emitted outside the case 140.

Variation Examples According to the Third Embodiment

Inside the case 140, wall portions that respectively partition a housing space for the rotating electric machine 40, a housing space for the inverter 30, and a housing space for the assembled battery 20 may be provided. In this case, wiring may be inserted through a through hole in the wall portion partitioning adjacent housing spaces among the housing spaces.

Fourth Embodiment

Figure 4:
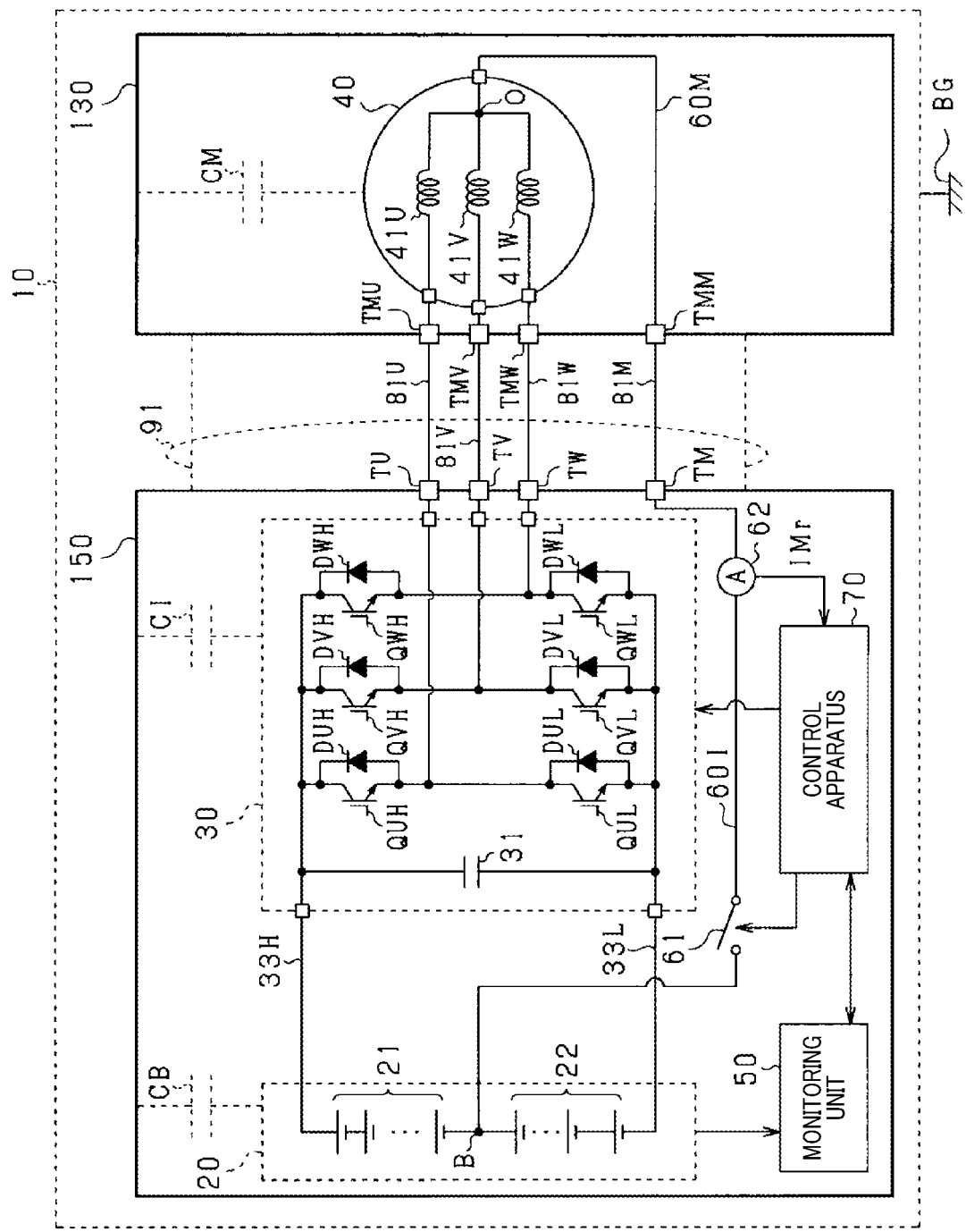
FIG. 4 is a configuration diagram illustrating a power conversion apparatus according to a fourth embodiment.

A fourth embodiment will be described below with reference to the drawings, mainly focusing on differences with the above-described embodiments. As shown in FIG. 4, according to the present embodiment, the assembled battery 20 and the inverter 30 are housed in a common case.

The assembled battery 20 and the inverter 30 are housed in a common case 150. The common case 150 is disposed in a position separated from the motor case 130. For example, the common case 150 may have a bottom plate portion, a peripheral wall portion provided in a peripheral portion of the bottom plate portion, and a top plate portion that covers a side of the peripheral wall portion opposite the bottom plate portion side. The assembled battery 20 and the inverter 30 are disposed in the bottom plate portion of the common case 150. According to the present embodiment, the common case 150 is composed of aluminum and provides an electromagnetic shield function. Here, according to the present embodiment, the common case 150 has the U-phase inverter terminal TU, the V-phase inverter terminal TV, the W-phase inverter terminal TW, and the neutral-point connection terminal TM.

The neutral-point connection terminal TM and the intermediate terminal B are connected by the inverter-side neutral-point wiring 601 inside the common case 150. The common case 150 also houses the monitoring unit 50, the control apparatus 70, the current sensor 62, the connection path 60, and the neutral-point switch 61.

Here, in FIG. 4, CI indicates the inverter stray capacitance formed between the inverter 30 and the common case 150. CB indicates the battery stray capacitance formed between the assembled battery 20 and the common case 150.

The motor-side shield wire 91 electrically connects the common case 150 and the motor case 130. As a result, noise flowing out to the body ground BG can be reduced.

Variation Examples According to the Fourth Embodiment

In a manner similar to the variation example according to the first embodiment, the common case 150 and the motor case 130 may be formed by a non-metal material that does not provide the electromagnetic shield function, rather than the metal material. In this case, a plating process (metal plating process) providing the electromagnetic shield function may be performed on surfaces of the cases 130 and 150. In addition, in this case, plated portions of the cases 130 and 150 may be electrically connected to each other by the motor-side shield wire 91.

When the common case 150 is formed by a non-metal material that does not provide the electromagnetic shield function, the high-potential-side electrical power wiring 33H, the low-potential-side electrical power wiring 33L, and the inverter-side neutral-point wiring 601 may be collectively covered by a shield wire inside the common case 150. As a result, emission noise emitted outside the common case 150 can be reduced.

Inside the common case 150, a wall portion that partitions a housing space of the inverter 30 and a housing space of the assembled battery 20 may be provided in the common case 150. In this case, the high-potential-side electrical power wiring 33H, the low-potential-side electrical power wiring 33L, and the inverter-side neutral-point wiring 601 may be inserted through a through-hole formed in the wall portion.

Fifth Embodiment

Figure 5:
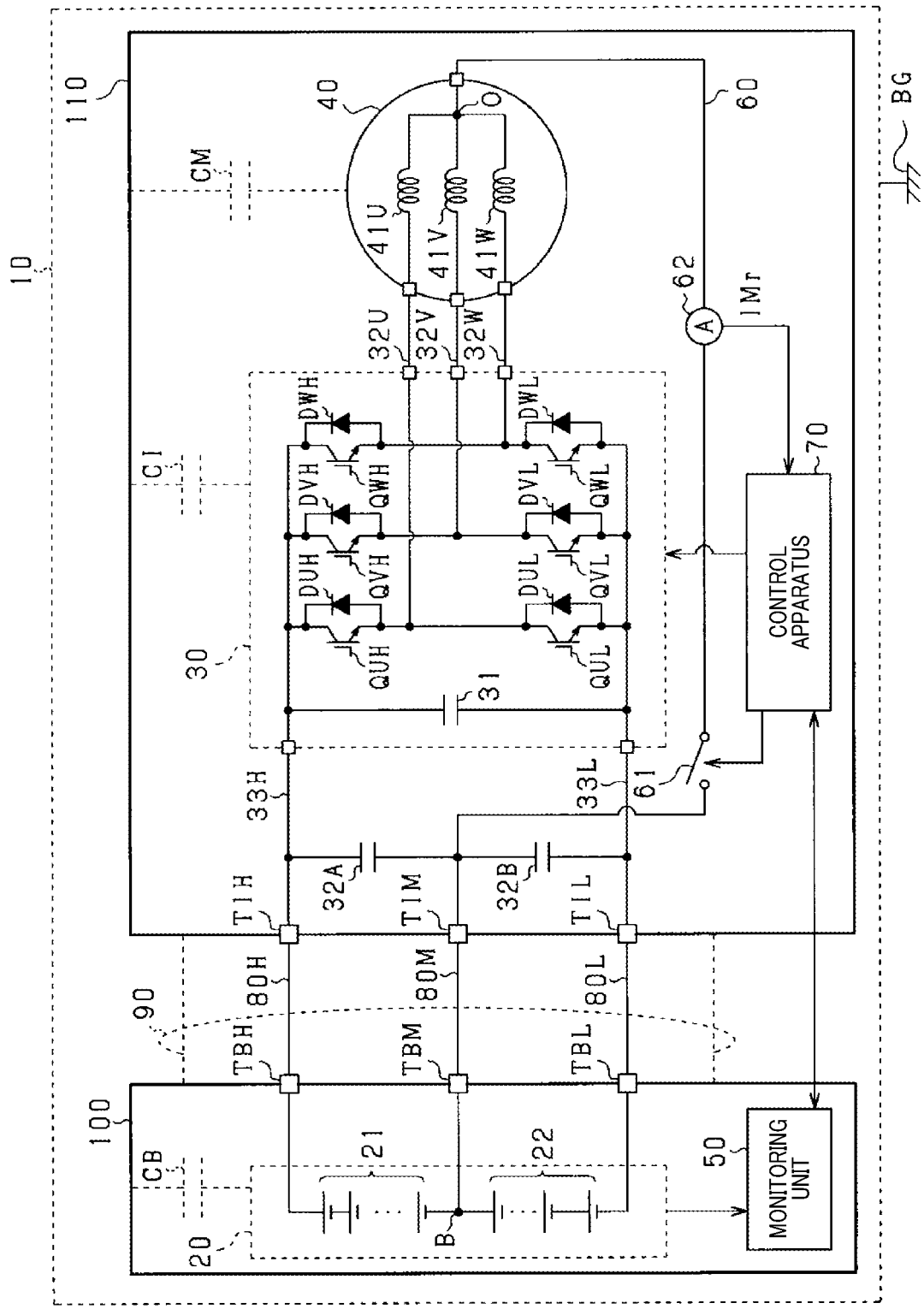
FIG. 5 is a configuration diagram illustrating a power conversion apparatus according to a fifth embodiment.

A fifth embodiment will be described below with reference to the drawings, mainly focusing on differences with the above-described embodiments. As shown in FIG. 5, according to the present embodiment, a first capacitor 32A and a second capacitor 32B are provided inside the common case 110. The first capacitor 32A connects the high-potential-side electrical power wiring 33H and the connection path 60. The second capacitor 32B connects the low-potential-side electrical power wiring 33L and the connection path 60.

According to the present embodiment described above, noise (normal mode noise) flowing from the neutral point O to the assembled battery 20 side through the connection path 60 is absorbed by the first capacitor 32A and the second capacitor 32B. As a result, noise can be suitably reduced.

Sixth Embodiment

Figure 6:
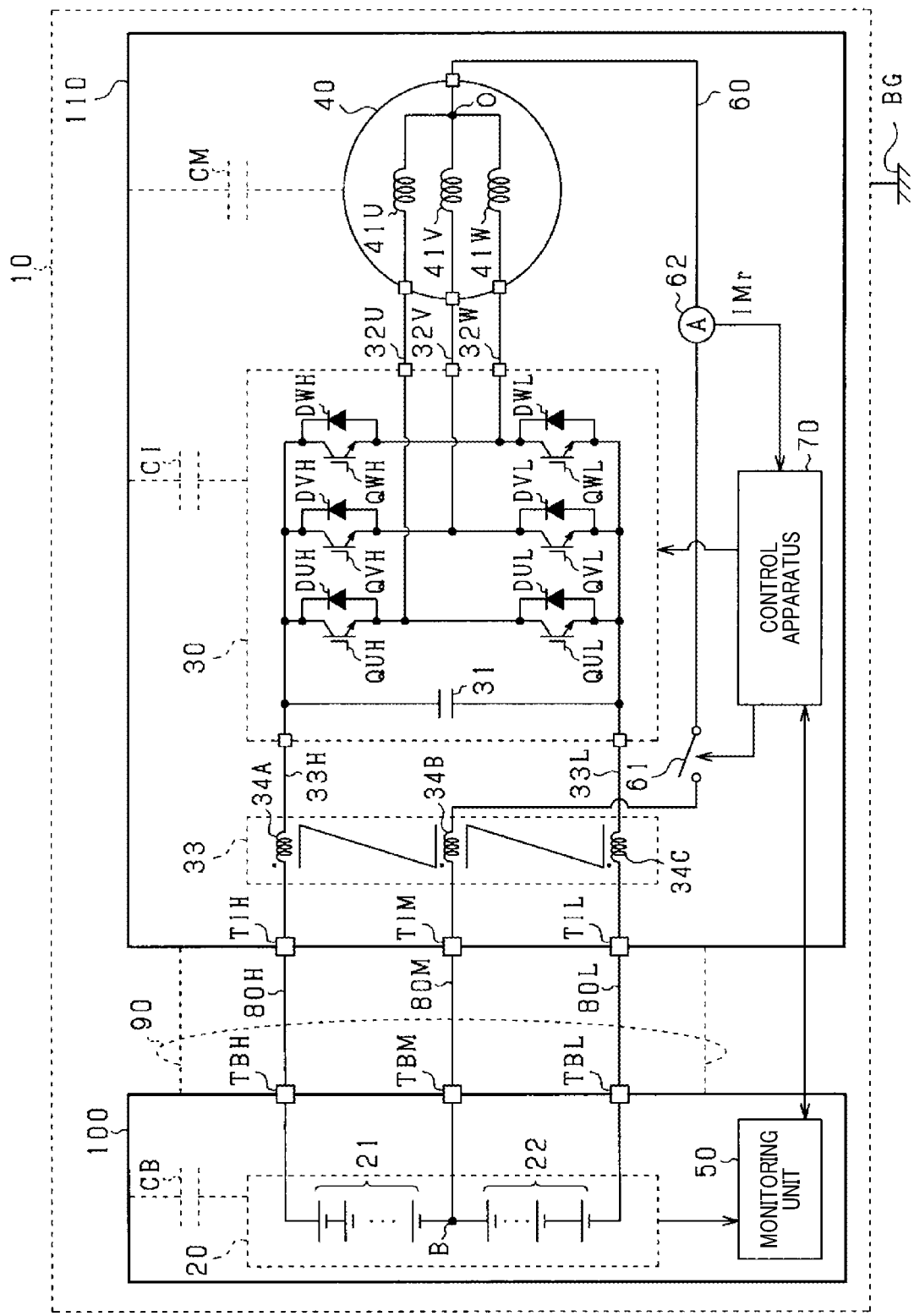
FIG. 6 is a configuration diagram illustrating a power conversion apparatus according to a sixth embodiment.

A sixth embodiment will be described below with reference to the drawings, mainly focusing on differences with the above-described embodiments. As shown in FIG. 6, according to the present embodiment, a common mode choke 33 is housed inside the common case 110. The common mode choke 33 includes a first coil 34A provided in the high-potential-side electric-power wiring 33H, a second coil 34B provided in the connection path 60, a third coil 34C provided in the low-potential-side electric-power wiring 33L, and a common magnetic body core (such as a ferrite core) around which the coils 34A, 34B, and 34C are wound. For example, the magnetic body core may be formed into an annular shape. The common mode choke 33 is configured such that, when a current flows from the rotating electric machine 40 side to the assembled battery 20 side in each of the high-potential-side electrical power wiring 33H, the connection path 60, and the low-potentials-side electrical power wiring 33L, magnetic fluxes flowing through the magnetic body core do not cancel each other out.

According to the present embodiment described above, the core around which the coils 34A to 34C are wound can be shared. Therefore, the common mode choke 33 can be reduced in size while common mode noise is reduced by the common mode choke 33.

Seventh Embodiment

Figure 7:
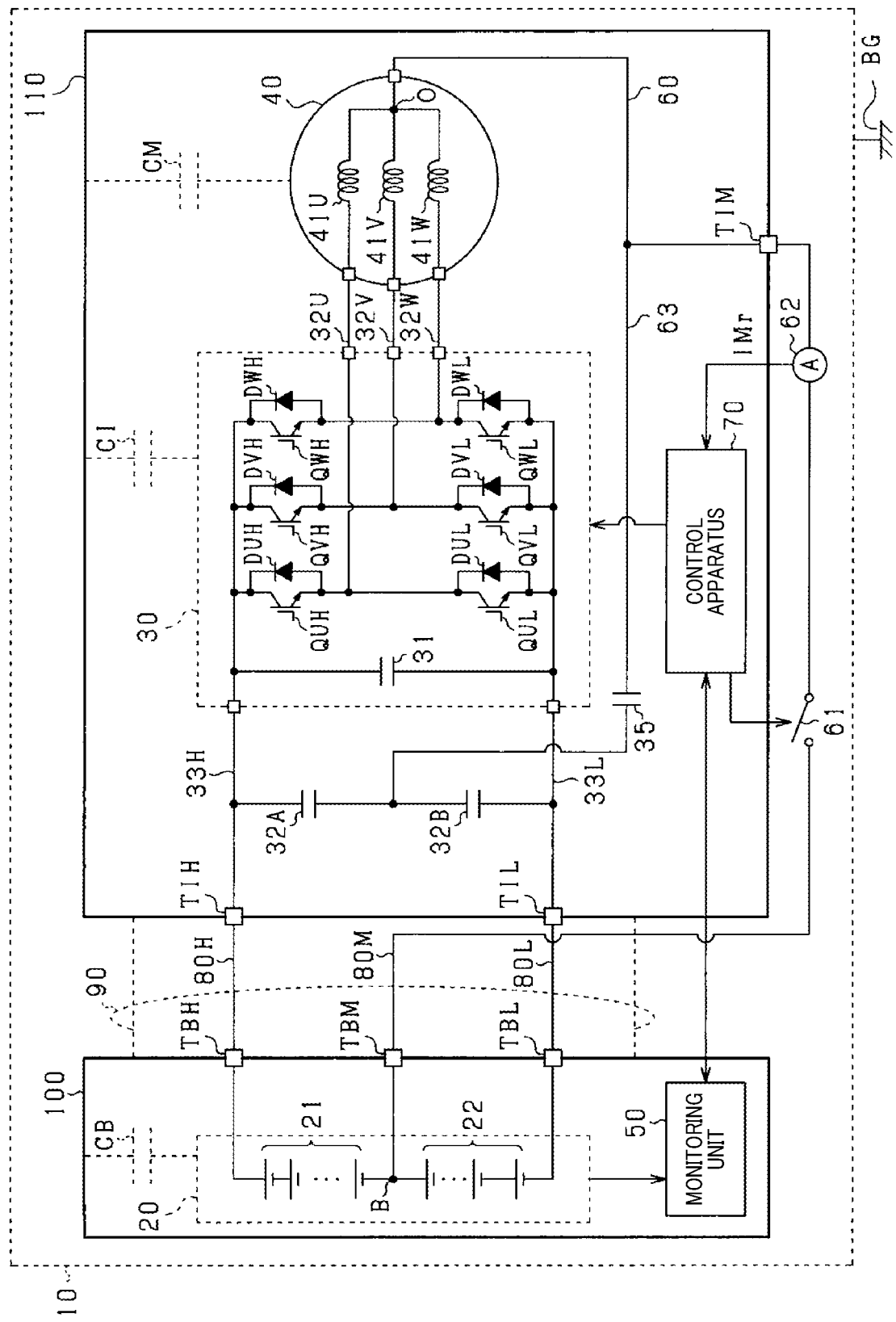
FIG. 7 is a configuration diagram illustrating a power conversion apparatus according to a seventh embodiment.

A seventh embodiment will be described below with reference to the drawings, mainly focusing on differences with the above-described embodiments. As shown in FIG. 7, according to the present embodiment, a portion of the neutral-point wiring is disposed outside the common case 110.

The neutral-point inverter terminal TIM of the common case 110 and the neutral point O are connected by the connection path 60 inside the common case 110. The neutral-point inverter terminal TIM and the neutral-point battery terminal TBM of the battery case 100 are connected by the battery-side inter-case wiring 80M. The neutral-point switch 61 is provided on the battery-side inter-case wiring 80M. That is, the neutral-point switch 61 is disposed outside the battery case 100 and the common case 110. Here, according to the present embodiment, the connection path 60 and the battery-side inter-case wiring 80M correspond to the "neutral-point wiring". A portion of the neutral-point wiring is disposed outside the common case 110 to prevent size increase of the common case 110.

A bypass wiring 63, the first capacitor 32A, the second capacitor 32B, and a third capacitor 35 are provided inside the common case 110. An intermediate portion of the connection path 60 is connected to a first end of the bypass wiring 63. The high-potential-side electric-power wiring 33H is connected through the first capacitor 32A, and the low-potential-side electric-power wiring 33L is connected through the second capacitor 32B to a second end of the bypass wiring 63. As a result, noise that is propagated from the neutral point O side to the assembled battery 20 side through the connection path 60 can be absorbed by the first capacitor 32A and the second capacitor 32B.

The third capacitor 35 is provided in the bypass wiring 63. As a result, only high-frequency noise components to be propagated from the neutral point O side to the assembled battery 20 side through the connection path 60 can be extracted and sent to the first capacitor 32A and the second capacitor 32B. Therefore, a direct current when voltage equalization control is performed and an alternating current when temperature increase control is performed can be suppressed from flowing to the bypass wiring 63.

Here, to suppress emission noise, the battery-side inter-case wiring 80M may be disposed in a state of being in contact with a front side surface of the common case 110.

Other Embodiments

Here, the above-described embodiments may be carried out so as to be modified in the following manner.

In the configuration shown in FIG. 7, the third capacitor 35 may not be provided. The neutral-point switch 61 may be provided in the peripheral wall portion of the inverter case 120 shown in FIG. 2 or the peripheral wall portion of the common case 150 shown in FIG. 4. This will be described below with the common case 150 shown in FIG. 4 as an example.

Figure 8:
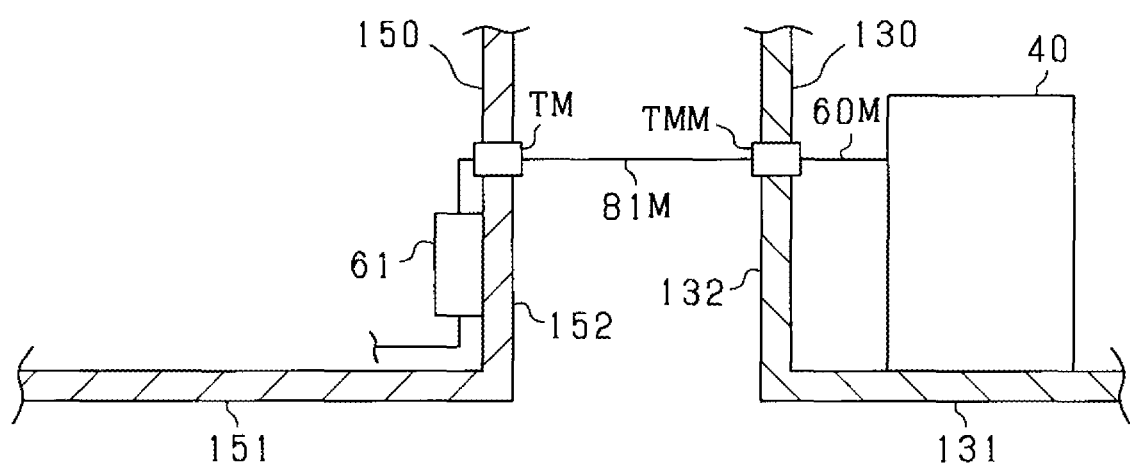
FIG. 8 is a configuration diagram illustrating a power conversion apparatus according to another embodiment.

As shown in FIG. 8, the common case 150 includes a bottom plate portion 151 and a peripheral wall portion 152 provided in a peripheral portion of the bottom plate portion 151. The motor case 130 includes a bottom plate portion 131 and a peripheral wall portion 132 provided in a peripheral portion of the bottom plate portion 131. The neutral-point connection terminal TM is provided in the peripheral wall portion 152 of the common case 150, and the motor neutral-point terminal TMM is provided in the peripheral wall portion 132 of the motor case 130. As a result, the neutral-point wiring is drawn into the common case 150 through the neutral-point connection terminal TM.

The neutral-point switch 61 is provided near the neutral-point connection terminal TM in the peripheral wall portion 152. In addition, the neutral-point switch 61 is provided further toward the neutral point O than a center portion of the neutral-point wiring from the neutral point O to the intermediate terminal B. The neutral-point switch 61 is disposed in this manner for the following reason.

When the controlled variable of the rotating electric machine 40 is controlled without temperature increase control or voltage equalization control being performed, the neutral-point switch 61 is turned off. In this case, a portion of the neutral-point wiring from the neutral point O to the neutral-point switch 61 functions as an antenna and may emit noise. Therefore, the antenna portion is preferably as short as possible. Thus, the antenna portion is made as short as possible by the neutral-point switch 61 being disposed as described above, and emission noise is suppressed.

The neutral-point switch 61 is not limited to a relay. For example, a pair of N-channel metal-oxide-semiconductor field-effect transistors (MOSFETs) of which sources are connected to each other, or IGBTs may be used as the neutral-point switch 61.

The neutral-point switch 61 is not a requisite. In this case, the intermediate terminal B and the neutral point O are electrically connected at all times.

Figure 9:
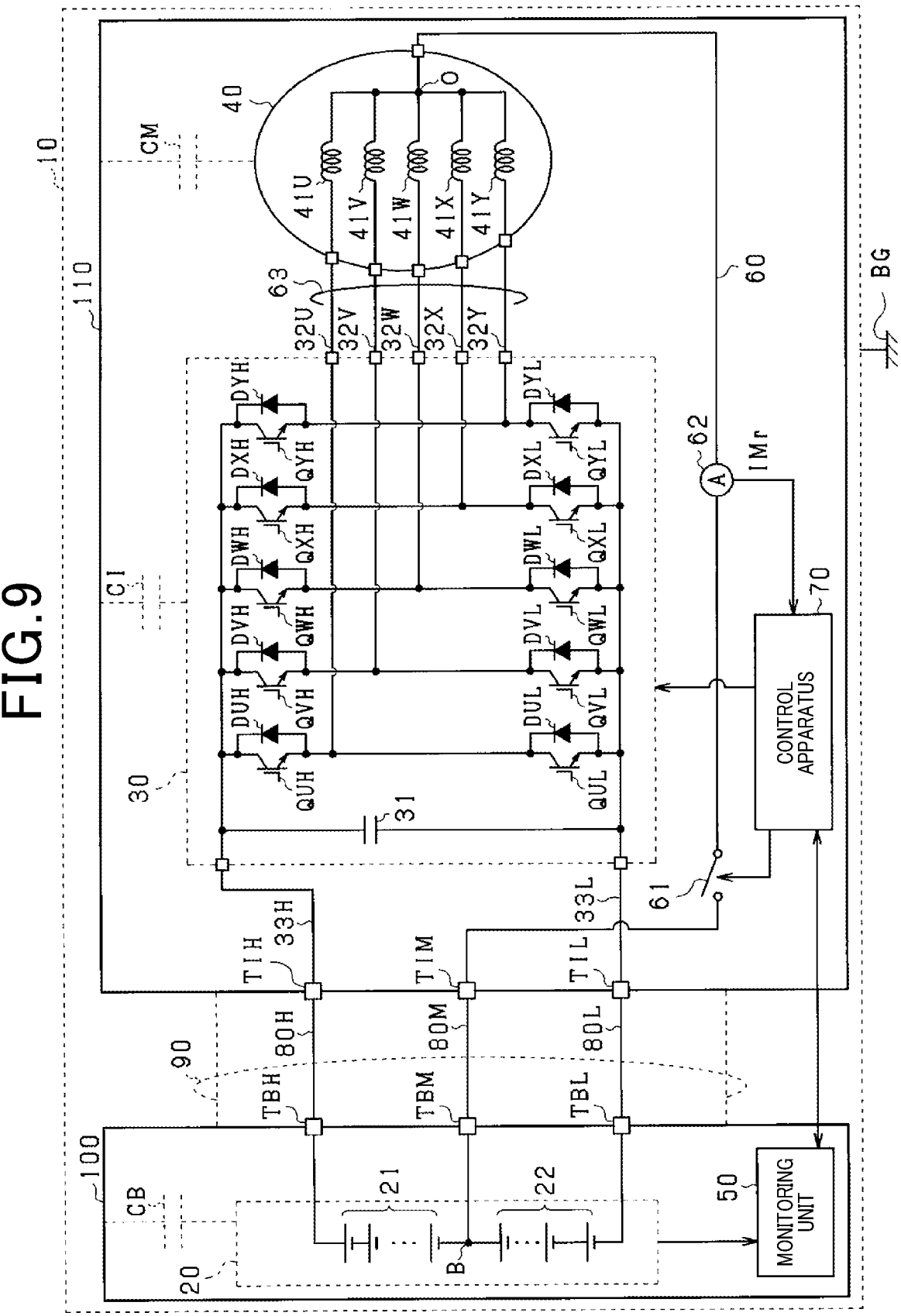
FIG. 9 is a configuration diagram illustrating a power conversion apparatus according to another embodiment.

The rotating electric machine and the inverter may have phases other than three phases, such as five phases or seven phases. FIG. 9 shows a power conversion apparatus in the case of five phases. In FIG. 9, in the inverter 30, X-phase upper- and lower-arm switches QXH and QXL, and diodes DXH and DXL are added. Y-phase upper- and lower-arm switches QYH and QYL, and diodes DYH and DYL are also added. In addition, in the rotating electric machine 40, an X-phase winding 41X and a Y-phase winding 41Y are added. Furthermore, in the power conversion apparatus 10, an X-phase conductor member 32X and a Y-phase conductor member 32Y are added.

Figure 10:
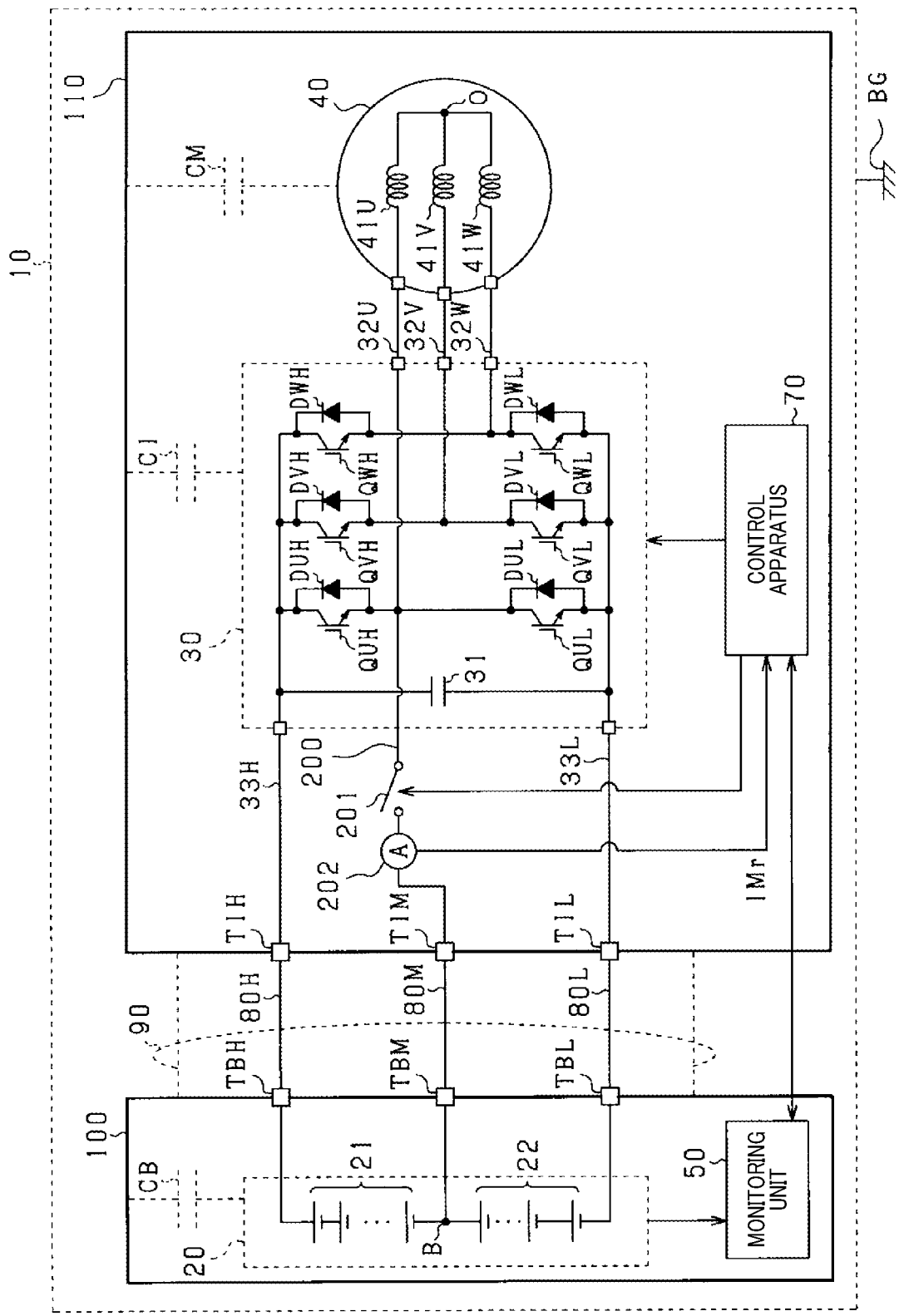
FIG. 10 is a configuration diagram illustrating a power conversion apparatus according to another embodiment.

The power conversion apparatus 10 may be that shown in FIG. 10, instead of that shown in FIG. 1. The power conversion apparatus 10 includes a connection path 200, a switch 201, and a current sensor 202 instead of the connection path 60, the neutral-point switch 61, and the current sensor 62. A first end of the connection path 200 is connected to the emitter of the upper-arm switch and the collector of the lower-arm switch of a portion of the three phases. In the example shown in FIG. 10, the first end of the connection path 200 is connected to the U-phase. A second end of the connection path 200 is connected to the neutral-point inverter terminal TIM. The switch 201 and the current sensor 202 are provided on the connection path 200.

The control apparatus 70 performs the above-described voltage equalization control and temperature increase control. Here, the neutral-point switch 61 is replaced by the switch 201. In addition, in the voltage equalization control and temperature increase control, the U-phase upper- and lower-arm switches QUH and QUL remain turned off, and switching control of the V- and W-phase upper- and lower-arm switches QVH, QVL, QWH, and QWL is performed.

In the configuration shown in FIG. 10 as well, emission noise accompanying switching control can be reduced and noise flowing out to the body ground BG can be reduced.

The upper- and lower-arm switches configuring the inverter are not limited to the IGBTs and may be N-channel MOSFETs.

For example, an electric double-layer capacitor may be used instead of the storage battery.

A moving body in which the power conversion apparatus is mounted is not limited to the vehicle and may, for example, be an aircraft or a ship. For example, when the moving body is an aircraft, the rotating electric machine provided in the aircraft may serve as a flight power source of the aircraft. When the moving body is a ship, the rotating electric machine provided in the ship serves as sailing power source of the ship. A mounting destination of the power conversion apparatus is not limited to the moving body.

The control unit and the method thereof described in the present disclosure may be actualized by a dedicated computer that is provided such as to be configured by a processor and a memory, the processor being programmed to provide one or a plurality of functions that are realized by a computer program. Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) storage medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power conversion apparatus comprising:
an inverter that includes a series connection body of upper- and lower-arm switches, the series connection body being connected in parallel to a series connection body of a first power storage unit and a second power storage unit;
a rotating electric machine that includes a winding that is electrically connected to the inverter;
a neutral-point wiring that electrically connects a negative electrode side of the first power storage unit and a positive electrode side of the second power storage unit, and a neutral point of the winding;
a control unit that performs switching control of the upper- and lower-arm switches such that a current flows between the first power storage unit and the second power storage unit through the inverter, the winding, and the neutral-point wiring; and
a case that houses at least the inverter and provides a shield function, wherein:
at least a portion of the neutral-point wiring is housed inside the case;
the case includes
a first case that houses the inverter, and
a second case that is disposed separated from the first case and houses the first power storage unit and the second power storage unit; and
the power conversion apparatus further comprises
a shield wire that covers a battery-side inter-case wiring that is a portion of the neutral-point wiring between a portion of the neutral-point wiring housed in the second case and a portion of the neutral-point wiring housed in the first case, and electrically connects the first case and the second case.

2. The power conversion apparatus according to claim 1, wherein:
the second case houses the rotating electric machine; and
the shield wire covers a neutral-point inter-case wiring that is a portion of the neutral-point wiring between a portion of the neutral-point wiring housed in the second case and a portion of the neutral-point wiring housed in the first case, and electrically connects the second case and the first case.

3. The power conversion apparatus according to claim 2, further comprising:
a motive-power wiring that electrically connects a connection point of the upper- and lower-arm switches and an end portion of the winding on a side opposite the neutral point side, for each phase, wherein
the shield wire covers a portion of the motive-power wiring between a portion of the motive-power wiring housed in the second case and a portion of the motive-power wiring housed in the first case, together with the neutral-point inter-case wiring.

4. The power conversion apparatus according to claim 2, further comprising:
a neutral-point switch that is provided on the neutral-point wiring, wherein
the control unit switches the neutral-point switch to on when switching control is performed, the first case has a bottom plate portion and a wall portion provided in a peripheral portion of the bottom plate portion, the neutral-point wiring is drawn into the first case through a terminal provided in the wall portion, and the neutral-point switch is provided near the terminal on an inner surface of the wall portion.

5. The power conversion apparatus according to claim 1, wherein:

the case houses the inverter and the rotating electric machine.

6. The power conversion apparatus according to claim 5, further comprising:

a bypass wiring of which a first end is electrically connected to the neutral point and that is housed in the case; and a first capacitor and a second capacitor that are provided inside the case, wherein each of a high-potential-side terminal side of the upper arm switch and a low-potential-side of the lower arm switch, and a second end of the bypass wiring are electrically connected inside the case, and portions of the neutral-point wiring from an intermediate portion toward the first power storage unit and second power storage unit side are disposed outside the case.

7. The power conversion apparatus according to claim 6, further comprising:

a third capacitor that is provided in the bypass wiring.

8. The power conversion apparatus according to claim 1, wherein:

the shield wire covers, together with the battery-side inter-case wiring, a portion of a wiring that electrically connects a positive electrode side of the first power storage unit and a high-potential-side terminal of the upper arm switch, and is not housed in the first case and the second case, and a portion of a wiring that electrically connects a negative electrode side of the second power storage unit and a low-potential-side terminal of the lower arm switch, and is not housed in the first case and the second case.

9. The power conversion apparatus according to claim 1, wherein:

the case houses the inverter, the first power storage unit, and the second power storage unit.

10. The power conversion apparatus according to claim 1, further comprising:

a neutral-point switch that is provided on the neutral-point wiring, wherein the control unit switches the neutral-point switch to on when switching control is performed, and the neutral-point switch is provided on the neutral-point wiring, further toward the neutral point side than a center portion is.

11. A power conversion apparatus comprising:

an inverter that includes a series connection body of upper- and lower-arm switches, the series connection body being connected in parallel to a series connection body of a first power storage unit and a second power storage unit;

a rotating electric machine that includes a winding that is electrically connected to the inverter;

a neutral-point wiring that electrically connects a negative electrode side of the first power storage unit and a positive electrode side of the second power storage unit, and a neutral point of the winding;

a control unit that performs switching control of the upper- and lower-arm switches such that a current flows between the first power storage unit and the second power storage unit through the inverter, the winding, and the neutral-point wiring;

a case that houses at least the inverter and the rotating electric machine; and a motive-power wiring that electrically connects a connection point of the upper- and lower-arm switches and an end portion of the winding on a side opposite the neutral point side, for each phase, wherein:

the case is formed by a non-metal material;

the motive-power wiring and at least a portion of the neutral-point wiring are housed inside the case;

a shield wire that covers the motive-power wiring and the neutral-point wiring is provided inside the case;

the case includes a first case that houses the inverter and a second case that is disposed separated from the first case and houses the first power storage unit and the second power storage unit; and the shield wire covers a battery-side inter-case wiring that is a portion of the neutral-point wiring between a portion of the neutral-point wiring housed in the second case and a portion of the neutral-point wiring housed in the first case, and electrically connects the first case and the second case.

12. The power conversion apparatus according to claim 11, wherein:

the shield wire covers, together with the battery-side inter-case wiring, a portion of a wiring that electrically connects a positive electrode side of the first power storage unit and a high-potential-side terminal of the upper arm switch, and is not housed in the first case and the second case, and a portion of a wiring that electrically connects a negative electrode side of the second power storage unit and a low-potential-side terminal of the lower arm switch, and is not housed in the first case and the second case.

13. The power conversion apparatus according to claim 11, wherein:

the case houses the inverter, the first power storage unit, and the second power storage unit.

14. The power conversion apparatus according to claim 11, further comprising:

a bypass wiring of which a first end is electrically connected to the neutral point and that is housed in the case; and a first capacitor and a second capacitor that are provided inside the case, wherein each of a high-potential-side terminal side of the upper arm switch and a low-potential-side of the lower arm switch, and a second end of the bypass wiring are electrically connected inside the case, and portions of the neutral-point wiring from an intermediate portion toward the first power storage unit and second power storage unit side are disposed outside the case.

15. The power conversion apparatus according to claim 14, further comprising:

a third capacitor that is provided in the bypass wiring.

16. The power conversion apparatus according to claim 11, further comprising:

a neutral-point switch that is provided on the neutral-point wiring, wherein the control unit switches the neutral-point switch to on when switching control is performed, and the neutral-point switch is provided on the neutral-point wiring, further toward the neutral point side than a center portion is.

17. A power conversion apparatus comprising:

an inverter that includes a series connection body of upper- and lower-arm switches, the series connection body being connected in parallel to a series connection body of a first power storage unit and a second power storage unit;

a rotating electric machine that includes a winding that is electrically connected to the inverter;

a neutral-point wiring that electrically connects a negative electrode side of the first power storage unit and a positive electrode side of the second power storage unit, and a neutral point of the winding;

a control unit that performs switching control of the upper- and lower-arm switches such that a current flows between the first power storage unit and the second power storage unit through the inverter, the winding, and the neutral-point wiring;

a case that houses at least the inverter and provides a shield function; and a first capacitor and a second capacitor that are provided inside the case, wherein at least a portion of the neutral-point wiring is housed inside the case, a high-potential-side terminal side of the upper arm switch and the neutral-point wiring are electrically connected by the first capacitor inside the case, and a low-potential-side terminal side of the lower arm switch and the neutral-point wiring are electrically connected by the second capacitor inside the case.

18. A power conversion apparatus comprising:

an inverter that includes a series connection body of upper- and lower-arm switches, the series connection body being connected in parallel to a series connection body of a first power storage unit and a second power storage unit;

a rotating electric machine that includes a winding that is electrically connected to the inverter;

a neutral-point wiring that electrically connects a negative electrode side of the first power storage unit and a positive electrode side of the second power storage unit, and a neutral point of the winding;

a control unit that performs switching control of the upper- and lower-arm switches such that a current flows between the first power storage unit and the second power storage unit through the inverter, the winding, and the neutral-point wiring;

a case that houses at least the inverter and provides a shield function; and a common mode choke that includes a first coil that is provided in a high-potential-side wiring that electrically connects a positive electrode side of the first power storage unit and a high-potential-side terminal of the upper arm switch, a second coil that is provided in the neutral-point wiring, a third coil that is provided in a low-potential-side wiring that electrically connects a negative electrode side of the second power storage unit and a low-potential-side terminal of the lower arm switch, and a common magnetic body core around which the first coil, the second coil, and the third coil are wound, wherein at least a portion of the neutral-point wiring is housed inside the case.

19. A power conversion apparatus comprising:

an inverter that includes a series connection body of upper- and lower-arm switches, the series connection body being connected in parallel to a series connection body of a first power storage unit and a second power storage unit;

a rotating electric machine that includes a winding that is electrically connected to the inverter;

a neutral-point wiring that electrically connects a negative electrode side of the first power storage unit and a positive electrode side of the second power storage unit, and a neutral point of the winding;

a control unit that performs switching control of the upper- and lower-arm switches such that a current flows between the first power storage unit and the second power storage unit through the inverter, the winding, and the neutral-point wiring;

a case that houses at least the inverter and the rotating electric machine;

a motive-power wiring that electrically connects a connection point of the upper- and lower-arm switches and an end portion of the winding on a side opposite the neutral point side, for each phase; and a first capacitor and a second capacitor that are provided inside the case, wherein the case is formed by a non-metal material, the motive-power wiring and at least a portion of the neutral-point wiring are housed inside the case, a shield wire that covers the motive-power wiring and the neutral-point wiring is provided inside the case, a high-potential-side terminal side of the upper arm switch and the neutral-point wiring are electrically connected by the first capacitor inside the case, and a low-potential-side terminal side of the lower arm switch and the neutral-point wiring are electrically connected by the second capacitor inside the case.

20. A power conversion apparatus comprising:

an inverter that includes a series connection body of upper- and lower-arm switches, the series connection body being connected in parallel to a series connection body of a first power storage unit and a second power storage unit;

a rotating electric machine that includes a winding that is electrically connected to the inverter;

a neutral-point wiring that electrically connects a negative electrode side of the first power storage unit and a positive electrode side of the second power storage unit, and a neutral point of the winding;

a control unit that performs switching control of the upper- and lower-arm switches such that a current flows between the first power storage unit and the second power storage unit through the inverter, the winding, and the neutral-point wiring;

a case that houses at least the inverter and the rotating electric machine;

a motive-power wiring that electrically connects a connection point of the upper- and lower-arm switches and an end portion of the winding on a side opposite the neutral point side, for each phase; and a common mode choke that includes a first coil that is provided in a high-potential-side wiring that electrically connects a positive electrode side of the first power storage unit and a high-potential-side terminal of the upper arm switch, a second coil that is provided in the neutral-point wiring, a third coil that is provided in a low-potential-side wiring that electrically connects a negative electrode side of the second power storage unit and a low-potential-side terminal of the lower arm switch, and a common magnetic body core around which the first coil, the second coil, and the third coil are wound, wherein the case is formed by a non-metal material, the motive-power wiring and at least a portion of the neutral-point wiring are housed inside the case, and a shield wire that covers the motive-power wiring and the neutral-point wiring is provided inside the case.

* * * * *